April 9, 1957 W. KOHLHAGEN 2,788,455
SELF-STARTING SYNCHRONOUS MOTOR
Filed Nov. 4, 1955 3 Sheets-Sheet 1
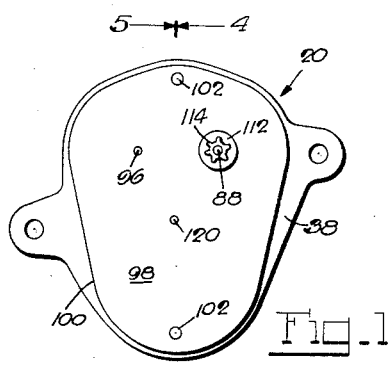
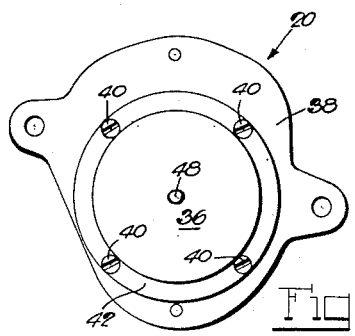
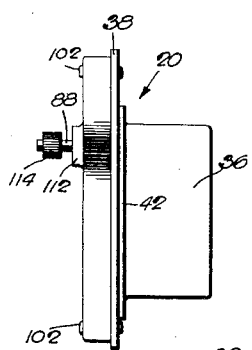
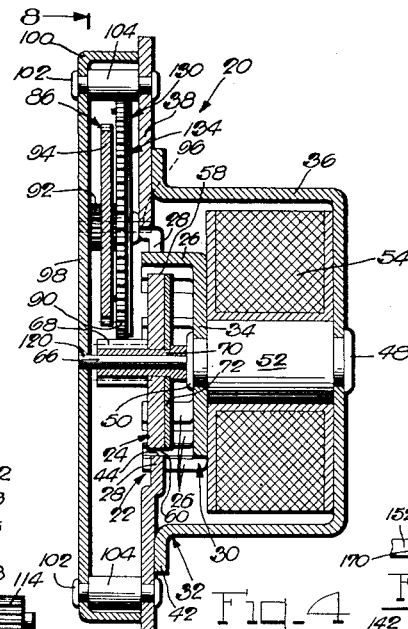
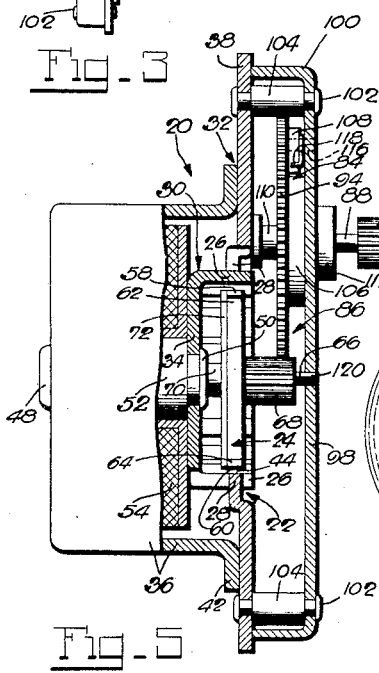
INVENTOR.
Walter Kohlhagen
BY
Walter Springer
Attorney.

April 9, 1957  W. KOHLHAGEN  2,788,455
SELF-STARTING SYNCHRONOUS MOTOR
Filed Nov. 4, 1955  3 Sheets-Sheet 2
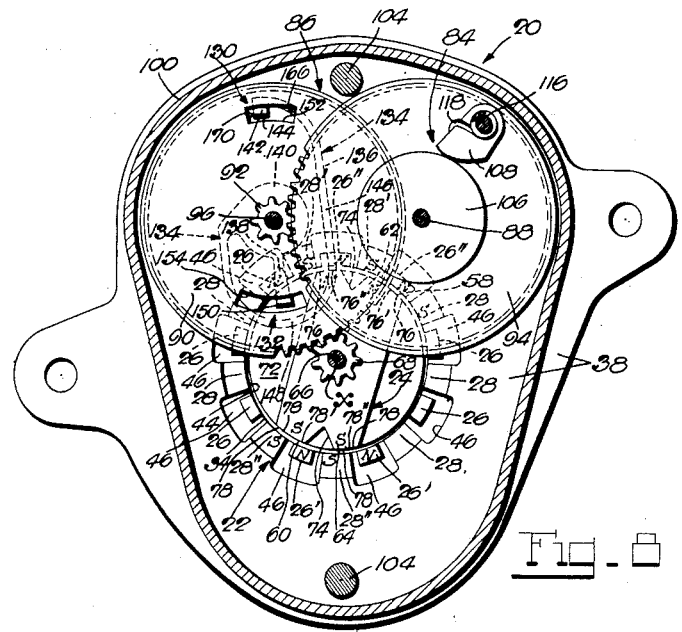
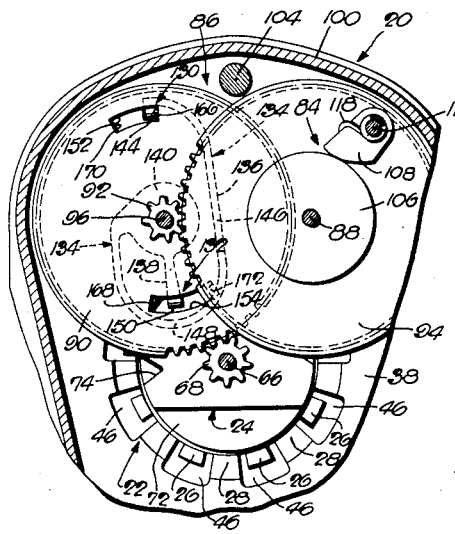
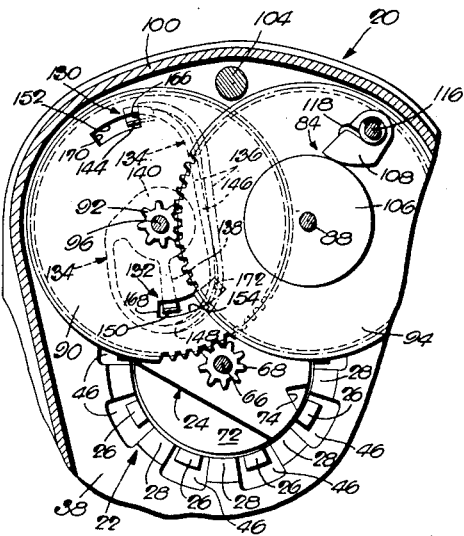
INVENTOR.
Walter Kohlhagen
BY
Attorney.

April 9, 1957

W. KOHLHAGEN 2,788,455

SELF-STARTING SYNCHRONOUS MOTOR

Filed Nov. 4, 1955

INVENTOR.
Walter Kohlhagen
BY
*Walter Bengel*
Attorney

United States Patent Office 2,788,455
Patented Apr. 9, 1957

2,788,455

SELF-STARTING SYNCHRONOUS MOTOR

Walter Kohlhagen, Elgin, Ill., assignor to The E. Ingraham Company, Bristol, Conn., a corporation of Connecticut Application November 4, 1955, Serial No. 544,953

28 Claims. (Cl. 310—41)

This invention relates to synchronous motors in general, and to self-starting synchronous motors in particular.

Motors of this kind have a multi-polar field of which alternate poles are of opposite sign or polarity at any given instant and change their polarities in phase with an alternating current supplied to the associated field coil, and a permanent-magnet rotor the poles of which cooperate with the field poles in driving the rotor in synchronism with the alternation of the current. The motor with which the present invention is concerned is of the type which is rendered self-starting by coordinating the rotor poles and field poles so that the rotor will on the first or subsequent polarization of the field poles become unstable in any idle position and start in either direction into phase with the field. In order that this type of motor may self-start under a load, some lost motion is usually provided between the rotor and load which affords freedom to the rotor to start into phase, and even move in phase, with its field before encountering the load. While motors of this type are highly advantageous for many applications and perform satisfactorily in many respects, they are seriously deficient in a vital respect.

Thus, it has been found that a goodly percentage, and at any rate objectionably high percentage, of a lot of identically produced and inspection-passed motors of this type under identical loads or even under no loads will occasionally fail to self-start, especially, though by no means exclusively, at lower voltages, while the rest of the motors will without fail self-start for the longest time. Since even close inspection of motors which failed in this respect, and their equally close comparison with motors which did not fail, did not bring to light any structural defects in the former which would have accounted for their failure, it is apparent that motors of this type may create operational "blind-spot" conditions which are uncontrolled and which interfere with, and even prevent, self-starting of these motors and, hence, render the self-starting behaviour of the latter at best uncertain. It is believed that this uncertain self-starting behaviour of motors of this type is at least in part due to occasional unfavorable or critical coordination between the rotor and its lost-motion connection with the load when the rotor comes to rest after the current is shut off, and the infrequent inability of the rotor subsequently to start in either direction under these conditions because restrained by the lost-motion connection to start in one direction in which it has a predominant urge to go. Of course, the mere fact that among a lot of identically produced and even inspection-passed motors of this type there will be a goodly percentage which sooner or later will fail to self-start at least once is to all practical intents and purposes as much a reflection on the reliability of the performance of these motors as if all of them would be expected to fail in this respect.

It is the primary aim of the present invention to provide a motor of this type which is no longer deficient as heretofore in respect to the vital function of self-starting under any conditions.

It is, therefore, an important object of the present invention to improve the self-starting characteristics of motors of this type to the extent of eliminating to all practical intents and purposes the aforementioned occasional operational blind spots in their starting performance, thereby immeasurably enhancing the reliable performance of these motors and also their use especially, though not exclusively, for timing purposes.

Another object of the present invention is to achieve the foregoing important objectives by exceedingly simple structure the fabrication and installation cost of which is at the most an insignificant part of the over-all cost of a motor of this type.

A further object of the present invention is to introduce in the drive between the rotor and load of a motor of this type a resilient coupling whose live action in nowise interferes with, but rather assists, the customary lost-motion provision in the same drive in providing the rotor with the necessary freedom to self-start without the load, and even more important, reacts with the rotor and load in preventing the aforementioned and also other unfavorable or critical conditions which were at least to a major extent responsible for the heretofore occasional "blind spots" in the starting performance of motors of this type.

Other objects and advantages will appear to those skilled in the art from the following, considered in conjunction with the accompanying drawings.

In the accompanying drawings, in which certain modes of carrying out the present invention are shown for illustrative purposes:

Figs. 1, 2 and 3 are front, rear and side views, respectively, of a motor embodying the present invention;

Fig. 4 is an enlarged section through the motor as taken on the line 4—4 of Fig. 1;

Fig. 5 is an enlarged part-sectional part-elevational view of the motor, the section being taken substantially on the line 5—5 of Fig. 1;

Fig. 6 is a view of a prominent component of the motor;

Fig. 7 is a section through the component taken on the line 7—7 of Fig. 6;

Fig. 7A is a fragmentary section taken on the line 7A—7A of Fig. 7;

Fig. 8 is a section through the motor taken substantially on the line 8—8 of Fig. 4;

Figs. 9, 10, 11 and 12 are fragmentary sections similar to Fig. 8, and showing certain operating parts of the motor in different operating positions;

Figure 11:
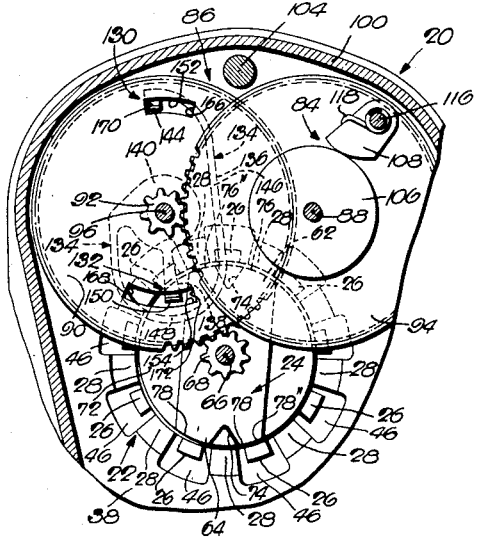

Referring to the drawings, and more particularly to Figs. 1 to 8 thereof, the reference numeral 20 designates a synchronous motor having a field structure 22 and an armature or rotor 24. The field structure 22 comprises two sets of field poles 26 and 28 which are provided on separate field casing sections 30 and 32, respectively. The casing section 30 is in the form of a disc 34 having struck-up prongs which are equiangularly spaced and constitute the field poles 26. The casing section 32 comprises a cup member 36 and a plate member 38 secured by screws 40, for instance, to a flange 42 on the cup member 36. The plate member 38 is died out to provide a circular opening 44 for the rotor 24, and a plurality of equiangularly spaced tooth-like formations which constitute the field poles 28 and are separated from each other by gaps 46. The field poles 26 and 28 may be of the same widths.

The casing sections 30 and 32 are suitably secured, in this instance by riveting as at 48 and 50, to the opposite ends of a post or core 52 (Fig. 4), so that the field poles 26 and 28 are arranged in alternate order and in substantial circumferential alignment with each other in the fashion shown in Fig. 8. More particularly, the field poles 26 project into the gaps 46 between successive field poles 28 and are equally spaced from the latter.

As shown in Fig. 4, a field coil 54 surrounds the core 52 and is interposed between the casing sections 30 and 32. Single-phase alternating current may be supplied to this coil from any suitable source. The casing sections 30 and 32 and the core 52 are made of any suitable non-permanent magnetic material. Due to their attachment to the opposite ends of the core 52, the casing sections 30 and 32 are, during energization of the field coil 54, magnetized at any given instant so that they are of opposite polarity. Accordingly, the alternate field poles 26 and 28 are of opposite polarity at any given instant, and their polarity changes in phase with the alternating current supplied to the field coil 54.

Referring now to the armature or rotor 24, the same is, in the present instance, in the form of a rectangular plate the opposite end edges 58 and 60 of which are arranged concentrically with respect to the rotor axis $x$ (Fig. 8). The rotor 24 is a permanent magnet having opposite poles 62 and 64.

Journalled on a forwardly projecting shank 66 on the core 52 is a pinion 68 which turns in unison with the rotor 24 and forms part of a torque-transmission drive to be described. In the present instance, the rotor 24 is suitably mounted on a hub portion 70 of the pinion 68 (Fig. 3). If desired, there may be secured to the rotor 24 a disc 72 of nonmagnetic material which serves as a flywheel to prevent surging of the rotor and instead compel it to turn uniformly when the field coil 54 is energized.

In order that the rotor 24 of the exemplary width shown may properly cooperate with the field poles 26 and 28, its opposite poles 62 and 64 are notched at 74 (Fig. 8) to divide them into pairs of spaced pole faces 76 and 78, respectively, so that the pole faces at the opposite ends of the rotor may align with successive field poles 26 and 28, respectively. The notches 74 in the rotor poles 62 and 64 are preferably V-shaped and are substantially of the same width as any of the field poles 26 or 28. The motor described so far is entirely conventional and forms no part of the present invention.

The present invention is applicable to a type of synchronous motors whose permanent-magnet rotors will, on producing alternating opposite instantaneous polarities in alternate field poles, self-start and run in either direction. In order to render the rotors of this type of synchronous motors self-starting, various expediencies are known to coordinate the poles of a rotor with the field poles so that the rotor will, on the first or subsequent polarization of the field poles, become unstable in any idle position and start in either direction into phase with the field.

One of the expediencies of thus rendering a permanent-magnetic rotor self-starting in either direction is disclosed in my prior Patent No. 2,677,776, dated May 4, 1954, and this same expediency is for the sake of convenience shown in the present drawings, and will also be described presently for a better understanding of the invention to be described hereinafter, though it is to be distinctly understood that the present invention is equally applicable with all the hereinafter described advantages to a synchronous motor whose permanent-magnet rotor is rendered self-starting in either direction by any of the other known expediencies. Thus, in order to render the exemplary rotor 24 self-starting in either direction, the notches 74 in the rotor poles 62 and 64, while arranged diametrically opposite each other, are offset from the respective centers of these rotor poles. Accordingly, the diametrically opposite pole faces 76' and 78' of the respective rotor poles 62 and 64 are wider than the diagonally opposite pole faces 76" and 78" thereof (Fig. 8). Further, the over-all width of each of the poles 62 and 64 of the exemplary rotor 24 exceeds the over-all spacing of three consecutive field poles 26, 28 (Fig. 11). Also, each of the pole faces 76" and 78" of smaller width is of a width in excess of that of any field pole 26 or 28. With the rotor 24 thus formed, the same will, on deenergization of the field coil 54 and just before coming to rest, seek and assume the nearest one of a number of angularly spaced idle or starting positions of minimum reluctance in each of which its pole faces 76 and 78 are adjacent the greatest possible mass of field pole material and its notches 74 are inevitably out of alignment with the nearest field poles 26 and 28. Thus, Fig. 8 shows the rotor 24 in one of its possible starting positions in which the notches 74 are clearly out of alignment with any of the adjacent field poles 26 and 28, and the pole faces 76 and 78 are in to substantially adjacent a maximum possible mass of field pole material. In this connection, it will be appreciated that it is only by virtue of the beforementioned widthwise relation of the rotor poles 62 and 64 and of the notches 74 therein and smaller-width pole faces 76" and 78" thereof to each other and to the widths and spacing of the field poles, that the pole faces 76 and 78 of the exemplary rotor 24 will, in any idle position of minimum reluctance of the latter, be adjacent a maximum mass of field pole material which involves portions of four consecutive field poles and, hence, compels the described disalignment of the notches 74 from the adjacent field poles in any idle rotor position.

In distinct contrast to these idle or starting positions of the rotor 24, the latter will, when running on energization of the field coil 54, have successive running positions of minimum reluctance, i. e., positions in which maximum magnetic forces occur and in each of which the notches 74 are in alignment with the oppositely polarized field poles 26 and 28 of a pair as shown in Fig. 11. An inspection of the momentary running position of minimum reluctance of the rotor 24 in Fig. 11 will further convince that the rotor would never stay at rest in this position after the field coil 54 is deenergized, because quite evidently a mass of field pole material distinctly less than a possible maximum mass thereof then confronts the pole faces 76 and 78. It is thus obvious that the rotor 24 will in any of its possible starting positions of minimum reluctance be inevitably spaced from any of its momentary running positions of minimum reluctance, wherefore the rotor will, on the first polarization of the field poles on each reenergization of the field coil 54, assuredly be drawn in either direction into, or at least toward, the nearest running position of minimum reluctance and thus start its normal run in synchronism with the alternating current supplied to the field coil. Thus, assuming that the pole faces 76 and 78 of the rotor 24 are of north and south polarities, respectively, and that the rotor is in the idle position shown in Fig. 8, and assuming further that on reenergization of the field coil 54 the initial polarities of the field poles 26 and 28 be as indicated in Fig. 8, it then follows that the north field poles 26' and south field poles 28' will attract the adjacent pole faces 78 and 76, respectively, of the rotor, resulting in counterclockwise rotation of the latter from the starting position in Fig. 8 substantially into the first momentary running position of minimum reluctance shown in Fig. 11. Supplementing the rotor-starting action of the north and south field poles 26' and 28' are the south and north field poles 28" and 26", respectively, which in the instant exemplary start of the rotor will repel the adjacent south and north pole faces 78 and 76, respectively, of the rotor (Fig. 8) and also compel the latter to turn counterclockwise into the position shown in Fig. 11. Thus, with the initial polarities of the field poles 26 and 28 being as described above and indicated in Fig. 8, the rotor 24 will self-start in counterclockwise direction. Conversely, if on reenergization of the field coil 54 the initial polarities of the field poles 26 and 28 would be opposite to those indicated in Fig. 8, the rotor 24 would start in clockwise direction, as will be readily understood. Once started in either direction, however, the rotor 24 will continue to run in the same direction in phase with the alternating current and, hence, in phase with the reversals of the polarities of the field poles 26 and 28.

The present motor 20 also has a directional drive control 84 (Fig. 8) which is interposed in an exemplary torque-transmission drive 86 from the rotor 24 to an output shaft 88, and functions to permit continued running of the rotor on a self-start of the same in a predetermined correct direction, and to cause reversal of the rotor on a self-start of the same in the opposite or wrong direction. The exemplary torque-transmission drive 86 provides two stages of speed reduction of which a first stage is formed by the previously mentioned pinion 68 and a gear disc 90 and the second stage is formed by a pinion 92 and a gear disc 94 (Fig. 8). To this end, the gear disc 90 is in mesh with the rotor pinion 68, and the pinion 92 is in mesh with the gear disc 94, while the gear disc 90 and coaxial pinion 92 may presently be considered to be turning in unison, though they have a special driving connection between them which will be described hereinafter. The coaxial gear 90 and pinion 92 are freely turnable on a shaft 96 which is mounted with its ends in the plate member 38 of the field section 32 and in the bottom wall 98 of a dished cover or casing 100 that encloses the elements of the torque-transmission drive 86 and is held against the plate member 38 by being suitably secured at 102 to pillars 104 on the latter (Figs. 4 and 1). The directional drive control 84 comprises, in the present instance, a disc 106 mounted on or integral with the gear disc 94, and a friction pawl 108 which cooperates with the disc 106 (Figs. 5 and 8). The gear 94 with its disc 106 is fast on the output shaft 88 which is journalled in suitable bearings 110 and 112 on the plate member 38 and bottomwall 98 of the cover 100, respectively, and carries a pinion 114 for driving connection with a load (Fig. 5). The pawl 108 is pivoted on a pin 116 in the bottomwall 98 of the cover 100 (Fig. 5) and is normally urged against the periphery of the disc 106 by a suitably anchored spring 118. Preferably, the core shank 66, on which the rotor 24 and pinion 68 turn, is mounted with its outer end 120 in a hole in the bottomwall 98 of the cover 100 (Fig. 5).

Assuming for the time being that the gear 90 and coaxial pinion 92 turn in unison, as aforementioned, and that there is substantial backlash between the meshing gears of the drive 86, and assuming further that on reenergization of the field coil 54 the initial polarization of the field poles 26 and 28 is such that the rotor 24 will self-start in the wrong direction, clockwise in this case, from the idle position in Fig. 8, the rotor will under these conditions take up such gear lash with which it is confronted before its rotary effect is transmitted through the pinions 68, 92 and gear 90 to the gear 94 in an effort to turn the latter also clockwise (Fig. 8). However, since clockwise rotation of the gear 94 is prevented by the friction pawl 108 (Fig. 8), the rotor 24 will be stopped rather suddenly in its clockwise progress and, in consequence, ordinarily rebound or reverse, with more or less aid from momentary favorable magnetic forces. On thus starting its reverse motion into correct counterclockwise direction, the rotor 24 will encounter relatively small opposition to its continued progress in the same direction while taking up the entire gear lash, so that the rotor will be in phase with the field when encountering the load on the output shaft 88 and, in consequence, will ordinarily start the load into, and keep it in, right-directional or counterclockwise motion (Fig. 8) which is permitted by the friction pawl 108 and disc 106 of the directional drive control 84. Assuming now that under the above-specified conditions the initial polarization of the field poles 26 and 28 on reenergization of the field coil 54 is such that the rotor will self-start in the right counterclockwise direction from the idle or starting position in Fig. 8, the rotor will take up such gear lash with which it is confronted before its rotary effect is transmitted to the output shaft 88 and, hence, to the load thereon. If the extent of the relatively free motion of the rotor afforded by its take-up of the confronting gear lash is sufficient to permit it to move into, or substantially into, phase with the field before it encounters the load, the rotor will ordinarily start the load into motion and keep it in motion. However, if the extent of such relatively free motion of the rotor afforded by the confronting gear lash is less than would be afforded by the entire gear lash and is insufficient to permit the rotor to move into phase with the field before encountering the load, the rotor will have insufficient torque to start an ordinary load into motion and, in consequence, will take the path of least resistance and reverse. The rotor will now be confronted with the entire gear lash and, hence, have relatively free motion of adequate extent to move into phase with the field before its rotary effect reacts with the friction pawl 108 and disc 106 of the directional drive control 84 and compels the rotor to reverse again, this time into right (counterclockwise) direction (Fig. 8). The rotor is now confronted with the entire gear lash and, hence, will be permitted to move into phase with the field before encountering the load, so that the rotor will this time have adequate torque to start the load and keep it in motion.

The above-described assumed performance of the motor 20 is indicative of the principle heretofore relied on in permitting motors of this type to self-start despite loads thereon, namely, to provide for limited free or lost motion between the rotor and the torque-output element or load in various known ways of which adequate backlash in a gear-type torque-transmission drive is but one of these ways. While attempts at self-starting of motors of this type with provisions for limited lost motion between rotor and load will succeed in by far the greater majority of cases, the fact remains that a goodly percentage of them will occasionally fail to self-start despite no apparent structural defects, as previously explained. As further mentioned hereinbefore, it is apparent that motors of this type may create operational "blind-spot" conditions in their starting performance which are uncontrolled and which account for the occasional failure of these motors to self-start. To the best of my knowledge and belief, these operational blind-spot conditions in the starting performance of motors of this type are at least in part brought about by occasional unfavorable or critical coordination between the rotor and its usual lost-motion connection with the load when, on shut-off of the current, the rotor seeks and comes to rest in one of its definite idle positions on only slight back-up from the load or, more rarely, when the rotor does not at all back away from the load, and the infrequent stalling of the rotor on subsequent reenergization of the field under either of these unfavorable or critical conditions is believed to be due to a blocking effect of the lost-motion connection on the rotor which keeps the latter in a near-state of neutral equilibrium or prevents its start in one direction in which it has a predominant urge to go despite successive polarity changes of the field poles.

In accordance with the present invention, the above-mentioned occasional unfavorable or critical coordination between the rotor and its usual lost-motion driving connection with the load is entirely eliminated by interposing a spring coupling in the lost-motion driving connection. An exemplary spring coupling device of the present invention is designated by the reference numeral 130 in the described motor 20 (Figs. 4 and 8). This exemplary spring coupling device 130 is, in the present instance, uniquely coordinated with a lost-motion device 132 in the torque-transmission drive 86, in that a single spring element 134 forms part of both devices 130 and 132 (see also Fig. 6). In the present instance also, the spring-coupling and lost-motion devices 130 and 132 are interposed between the gear 90 and pinion 92 of the torque-transmission drive 86.

The spring element or leaf 134 is conveniently blanked from suitable sheet metal stock and has a generally G-shaped portion 136 and an arm portion 138 (Figs. 6 and 8). The inner end of the G-portion of the spring leaf is formed as a hub part 140, while the outer end 142 thereof extends inwardly and is in part bent out of the plane of the spring leaf to form a coupling part or finger 144 (see also Fig. 7). The hub and coupling parts 140 and 144 are joined by a relatively narrow band-like part 146 of the G-portion of the spring leaf which at 148 is formed substantially semicircular. The arm portion 138 of the spring element 134 extends radially from the hub part 140 and has its outer end bent out of the plane of the spring element or leaf 134 to form another coupling part or finger 150 (Fig. 7). Preferably, the arm portion 138 is throughout its length of greater width than the band-like part 146 of the G-portion for a reason which will become apparent hereinafter.

The coupling parts 144 and 150 of the G and arm portions 136, 138 of the spring element 134 cooperate, in the present instance, with concentric slots 152 and 154, respectively, in the gear disc 90, while the spring element 134 is anchored to the pinion 92. The gear disc 90 and pinion 92 are mounted for independent coaxial rotation, and to this end the pinion 92 has an axial shank or hub 156 on which the gear disc 90 is freely turnable (Fig. 7). In this instance, the spring element 134 is with its hub part 140 staked or otherwise secured at 158 to the end of the shank 156 of the pinion 92 so as to turn in unison with the latter relative to the gear disc 90. In thus securing the spring element 134 to the shank 156, the former, together with the pinion 92 and gear disc 90 (Figs. 6 and 7) form a self-contained component 160 of the torque-transmission drive 86. The hub 156 of the pinion 92 is axially bored at 162 for the rotary mounting of the drive component 160 on the earlier described shaft 96 (Figs. 4 and 8).

The G-portion 136 and coupling finger 144 thereof of the anchored spring element 134 and the slot 152 in the gear disc 90 form the aforementioned spring-coupling device 130 between the latter and the pinion 92, while the arm portion 138 and coupling finger 150 thereof of the anchored spring element 134 and the slot 154 in the gear disc 90 form the aforementioned lost-motion device 132 between the latter and the pinion 92.

Further in accordance with the present invention, the rotor 24 has in any event sufficient free motion normally to self-start without interference from the spring-coupling device 130. To this end, the arcuate lengths of the slots 152 and 154 in the gear disc 90 and the dispositions of these slots and respective cooperating coupling fingers 144, 150 of the spring element 134 may be so coordinated that the gear 90 and pinion 92 may have completely free relative motion through a range determined by the permissible relative motion between the slot 152 and projecting coupling finger 144 therein. This free-motion range extends between the respective relative positions of the slot 152 and coupling finger 144 shown in Figs. 9 and 11, as will be readily understood.

Figure 12:
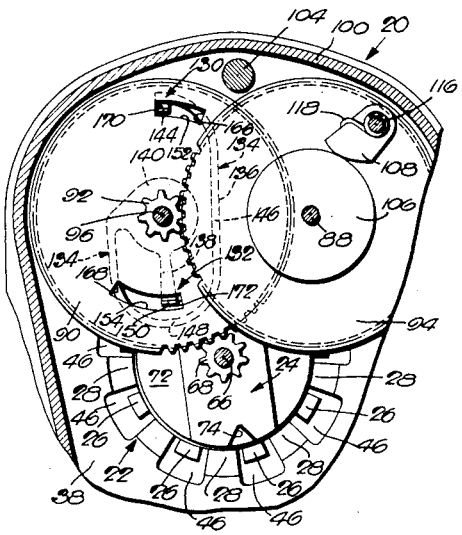

On relative rotation between the gear 90 and pinion 92 beyond one end of the aforementioned free-motion range, such as by turning gear 90 counterclockwise from the position in Fig. 9 relative to the pinion 92, the end wall 166 of the slot 152 acts through the coupling finger 144 to deflect the G-portion 136 of the spring element 134 from the dot-and-dash line disposition into the dotted line position, for instance, in Fig. 10, whereby primarily the semicircular part 148 of the G-portion 136 acts in torsion and lends to the latter spring characteristics which at gradually increasing rate resiliently oppose relative rotation between the gear 90 and pinion 92 beyond the aforesaid end of the free-motion range. Resiliently opposed relative rotation between gear 90 and pinion 92 beyond this same end of the free-motion range reaches its limit, however, when the end wall 168 of the slot 154 engages, or is engaged by, the coupling finger 150 on the arm portion 138 of the spring element 134 (Fig. 10) since this arm portion of the spring element has no spring characteristics and will not yield. On relative rotation between the gear 90 and pinion 92 beyond the other end of the aforementioned free-motion range, such as by turning gear 90 clockwise from the position in Fig. 11 relative to the pinion 92 into the position shown in Fig. 12, for instance, the end wall 170 of the slot 152 acts through the coupling finger 144 to deflect the G-portion 136 of the spring element 134 whereby primarily the semicircular part 148 of this G-portion acts again in torsion and causes the latter yieldingly to oppose such relative rotation with a gradually increasing force. Resiliently opposed relative rotation between gear 90 and pinion 92 beyond this other end of the free-motion range reaches its limit, however, when the end wall 172 of the slot 154 engages, or is engaged by, the coupling finger 150 on the non-yielding arm portion 138 of the spring element 134 (Fig. 12). It is, therefore, apparent from the foregoing that with the present arrangement of the spring-coupling and lost-motion devices 130 and 132, respectively, relative rotation between the members 90 and 92 throughout the aforementioned free-motion range takes place within an intermediate part of the lost-motion range of these members determined by the permissible relative motion or rotation between the slot 154 in the gear 90 and the coupling part 150 of the spring element 134 therein, and that relative rotation between these members beyond the free-motion range to either adjacent end of the lost-motion range is resiliently opposed by the G-portion 136 of the spring element 134.

Following is a description of an exemplary start of the present motor with the specific spring-coupling and lost-motion devices 130 and 132 in action. Thus, let it be assumed that current is suplied to the motor 20 when the rotor 24 is in the idle position shown in Fig. 8 and that the initial polarities of the field poles 26, 28 are such as to compel the rotor into a wrong-directional clockwise self-start, the rotor will then have ample opportunity to get in phase with its field while having complete freedom of motion until the end wall 166 of the slot 152 in the gear 90 moves into engagement with the coupling finger 144 of the spring element 134 (Fig. 9). The rotor 24 has by this time developed sufficient torque to overpower the initial resistance offered by the spring element 134 to its continued clockwise motion and will gradually deflect and stress the latter until the ensuing spring force thereof overpowers the rotor and compels the same to reverse when reaching the position in Fig. 10, for instance, the rotor having no choice but to reverse because of the block action of the directional drive control 84. The stressed dotted-line spring element 134 in Fig. 10, in its effort to recover its original dot-and-dash line shape, will, through intermediation of the gear 90 and pinion 68, exert on the rotor a live force which not only slows down the rotor gradually and assists the same in its reverse but also impels the same for some distance in the reverse or correct counterclockwise direction and thus accelerates the rotor into correct phase with its field. Even after the spring element 134 ceases to assist the rotor 24 in its reverse motion when the former reaches the dot-and-dash line position in Fig. 10, the rotor will continue in motion without any opposition throughout its entire free-motion range, i. e., until the end wall 170 of the slot 152 in the gear 90 moves into engagement with the coupling finger 144 of the spring element 134 (Fig. 11), wherefore the rotor will then assuredly have reached stable running condition and assume the load on the output shaft 88 as the G-portion 136 of the spring element 134 becomes gradually stressed and as gradually applies the load to the rotor (Fig. 12). Preferably, the spring characteristics of the G-portion 136 of the spring element 134 are such that the G-portion will serve as a resilient part of the drive 86 while the load is being driven, and this is indicated in Fig. 12 by the deflected condition of the G-portion 136 and the disposition of the coupling finger 150 on the arm portion 138 of the spring element in spaced relation with the adjacent end wall 172 of the slot 152 in gear 90.

The intervention of the spring coupling 130 in the torque-transmission drive 86 with its lost-motion device 132 produces several noteworthy and highly beneficial results in the above-described exemplary start and run of the motor. Thus, the spring coupling 130 acts gradually to slow down the rotor 24 after its wrong-directional start and assists the same in its reverse, and thereupon impels the rotor for some distance in the reverse or correct direction. Hence, the spring coupling 130 absorbs energy from the rotor 24 as it yields to the same and slows it down, and this energy is subsequently released by the spring coupling for beneficially assisting the rotor in its reverse and impelling the same in reverse direction for some distance. In previous motors of this type with a free or lost-motion device, the rotor will, on a wrong-directional start and on take-up of the confronting lost motion, be suddenly confronted with a solid barrier in the form of any of the conventional directional drive controls, and the ensuing shock to the rotor, while fundamentally objectionable for good and sufficient reasons, is even imperative in that it will cause at least slight rebound of the rotor without which the field might well fail to urge the latter into reverse motion. Moreover, in these previous motors an unfavorable condition, which does cause starting failure, though very rarely, may arise when the rotor, after shut-off of the current, for some reason backs up an excessive amount before finding a suitable idle position, and in doing so takes up most, if not all, of its available lost motion. In consequence, when the rotor on the next energization of the field coil tends to start in the wrong direction, it has neither no free motion or only inadequate free motion to get into phase with the field, and may under the circumstances be held stationary by the directional drive control in a state of neutral, or between neutral and stable, equilibrium from which the field may not drag it for some time, if at all, before the field coil is next deenergized. Such an unfavorable condition may never arise in the instant motor because the spring coupling will assuredly prevent the rotor, in its search for an idle position, from ever backing up to the end of its lost-motion range, and will in any event, i. e., even if the rotor should back up to the very end of its free-motion range, permit the rotor to start wrong-directionally substantially without any resistance until the spring coupling reacts with the rotor and assuredly reverses the latter and even impels the same in the reverse direction for a definite distance before it reaches free-motion range wherein it will assuredly reach stable running or phase condition if it has not already reached the same before entering the free-motion range and while being impelled by the spring coupling.

Another important advantage of the spring coupling 130 in the before-described exemplary start and run of the motor is the gradual application of the load to the rotor 24 which goes far toward preventing the latter from getting out of phase with the field and, hence, stalling or reversing, when assuming the load. In distinct contrast thereto, the rotors in previous motors of this type with a mere lost-motion device are quite apt to get out of phase with the field and, hence, stall or reverse, when suddenly encountering the entire load. It is for this very reason that the permissible maximum loads on previous motors of this type are limited so that their sudden pick-up in toto by the rotors will not throw the latter out of phase with their fields. In consequence, the maximum permissible loads on previous motors of this type are quite considerably smaller than the maximum loads that could be kept in motion by these motors. In distinct contrast thereto, the present motor will, by virtue of its spring coupling and ensuing gradual application of the load to the rotor, be able to assume a considerably larger load without getting out of phase with its field and stall or reverse in consequence. Accordingly, the present motor may start and drive a load that comes fairly close to the maximum load which it could keep in motion. Furthermore, a previous motor of this type, with a lost-motion device but without the present spring coupling, may well pick up and drive a given load at higher voltage, but it may well fail to do so at lower voltage, while the same motor, if provided with the present spring coupling, will assuredly pick-up and drive the same load at even the lowest voltage. In consequence, it is quite evident that the present motor with its spring coupling may at high and low voltages start and drive a considerably greater load than a previous motor of this type with a mere lost-motion device or, conversely, the present motor may be of smaller construction than a previous motor of this type in order to start and drive the maximum permissible load which the latter may start and drive.

Reverting now again to the operation of the present motor 20 with its spring coupling 130 and lost-motion device 132, let it be assumed that the rotor 24 will, on energization of the field coil 54, self-start from the idle position in Fig. 8 in the right direction, i. e., counterclockwise, it then follows that the rotor will have the opportunity to get a good start toward stable running or phase condition by the time it has taken up its available free motion, i. e., when the end wall 170 of the slot 152 in the gear 90 engages the coupling finger 144 on the spring element 134 (Fig. 11). The rotor 24, while now beginning to react with the spring element 134, may nevertheless accelerate its pace briefly and even reach substantially stable running condition, or come sufficiently close to it to overpower the initially encountered small part of the load, before the increasing resilient opposition of the spring element can force the rotor out of, or at least further from, phase with its field. Under the circumstances, it may well be that the rotor 24 while still tracking behind phase when initially encountering a small part of the load through the spring element 134, will advance into phase with its field and assume the rest of the load as it is being applied thereto by the spring element, in which case the rotor will continue to run in the right direction and drive the load despite the initially available small part of its free-motion range for its self-start (Fig. 8). However, if the rotor fails to come sufficiently close to stable running condition to overpower the increasing resilient opposition of the spring element, the spring force of the latter will not only assist the rotor in reversing but will impel the latter for some distance in reverse, and this time wrong, direction. In thus proceeding in the latter direction, the rotor has more than ample opportunity to reach stable running condition, especially as it has its entire free-motion range to traverse before being again reversed for assured pick-up and drive of the load on the next attempt, as already fully explained in the preceding description of the exemplary wrong-directional self-start of the rotor.

The intervention of the spring coupling 130 in the torque-transmission drive 86 with its lost-motion device 132 produces additional and highly important results in or affecting the above-described right-directional self-start of the motor. To begin with, when the current is shut off to conclude an operating run of the motor, the spring coupling 130 will without fail act to back the rotor away from the load for some distance so that the rotor will seek an idle position in which it is in no event closer to the load than this distance, and is in most cases even at a greater distance from the load, such as in Fig. 8, for instance. Accordingly, if in a possible, but infrequent, case the rotor 24 should on a right-directional self-start have practically no free motion available, it will nevertheless have some lost motion relative to the load, though such lost motion will increasingly be opposed by the spring coupling 130, as will be readily understood. Hence, while the rotor 24 will under these conditions generally fail to develop on its right-directional start sufficient torque to overcome the increasing resistance of the spring coupling 130, the spring coupling will not only compel the rotor to reverse but assuredly impel it in the reverse or wrong direction for some distance so that the rotor will in any event reach without fail its free-motion range in which it has more than ample opportunity to reach stable running condition for its subsequent, equally assured, reversal into the right direction, as previously explained. The spring coupling is further advantageous in its reaction with the rotor, in that its resiliency at least does not interfere with, and in many cases aids, oscillation or vibration of the rotor which is imperative for its start from idle position or on reversal thereof. In distinct contrast thereto, previous motors of this type with a lost-motion device but without the present or equivalent spring coupling, will occasionally fail, altogether or at least for an unreasonable period of delay, to self-start if the rotor is on the first or subsequent polarization of the field poles urged into the right direction. Motor starting failure or delay under these circumstances is a distinct possibility on any attempt by the field to start the rotor in the right direction from an idle position in which the same is quite frequently backed only slightly away from the load or, more rarely, is not at all backed away from the load. In either event, the lack of sufficient free motion of the rotor to come anywhere near stable phase condition when encountering the full load and/or the suppressive effect of the latter on oscillation or vibration of the rotor may, and occasionally will, keep the rotor stalled despite the efforts of its field to set it in motion. Stalling of the rotor for the same reasons may even occur when there is no utility load on the motor and the load encountered by the rotor is merely a torque-transmission drive of a speed-reduction or other type with which a utility load is adapted to be connected.

It follows from the preceding that a self-start of the motor is rendered less certain the closer the idle rotor is to the load, yet it is an inherent characteristic of motors of this type that the rotor will seek among its numerous definite idle positions most generally the one nearest or next nearest to the load and it is within this unfavorable range of coordination between the load and the rotor in its more general idle position that the aforementioned blind spots in the starting performance of previous motors of this type primarily occur. Since with the provision of the instant spring coupling 130 the rotor assumes an idle position in which the same is in any event spaced from the load, and the rotor also receives, within the very coordination range just above mentioned as unfavorable, live assistance from the spring coupling not only in the rotor's response by way of vibration to the tendencies of the field to set it in motion, but also to reverse the rotor in any event if it cannot overpower the confronting load and forcefully impel it in reverse direction all the way to its free-motion range, the aforementioned blind-spot conditions in the starting performance of the motor are largely eliminated. In fact, it has been found that with the spring coupling acting at both ends of the free-motion range of the rotor, self-starting of the motor is to all practical intents and purposes unfailing under any and all conditions. This seems to indicate that the spring coupling has eliminated at least most, if not all, of the so-called blind-spot conditions in the starting performance of motors of this type.

It is now evident that the spring coupling intervention between the rotor and its lost-motion connection with a load performs many heretofore unattainable control functions and secures the hereinbefore-described highly important advantages as well as other advantages not even mentioned. Among these other advantages is, for instance, the ability of the spring coupling to absorb momentary torque variations of the rotor and also momentary changes in the load, thus making it even less possible for the rotor to get out of phase with its field when subjected to the load.

While for reasons explained herein, it is preferable that the G-portion 136 of the spring element 134 form a resilient part of the torque-transmission drive 86 while driving the load, it is, of course, feasible to use, in lieu of the G-portion of the spring element, the arm portion 138 of the latter as a non-yielding part of the drive 86 while driving the load, without sacrificing the important advantages which the resilient intervention of the spring coupling between the rotor and load for assured self-starting performance of the motor will secure in any event. Thus, the G-portion 136 of the spring element 134 may be so calibrated that it will resiliently react with the rotor and load to assume at least a part of the load, but will on assuming an additional part of the load be flexed to an extent where the end wall 172 of the slot 154 in the gear 90 (Fig. 12) will come into engagement with the coupling finger 150 on the rigid arm portion 138 of the spring element so that the remainder of the load will be assumed by this rigid arm portion.

In order that the coupling finger 144 of the resilient G-portion 136 of the spring element 134 may not jump or be cammed from its slot 152 in the gear 90 when forcefully reacting with either end wall 166 or 170 thereof, the opposite side edges 170 and 172 of the coupling finger 144 are flared outwardly as shown in Fig. 7A so that they will wedge with the respective end walls of the slot 152 with which they are in engagement. The side edges of the coupling finger 150 on the arm portion 138 of the spring element 134 may be similarly flared.

The instant spring element 134 and its operating connection with the gear 90 are further noteworthy in that in case of breakage of the G-portion or other disconnection of the latter for any reason from the gear 90, the lost-motion device 132, constituted by the rigid arm portion 138 of the spring element with its coupling finger 150 and the slot 154 in the gear 90, will remain intact and the motor will very likely start satisfactorily thereafter for a long time despite the inaction of the spring-coupling device 130.

Figure 13:
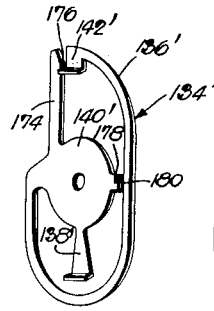
Fig. 13 is a perspective view of a modified prominent element of the motor.

Fig. 13 shows a modified spring element 134' which may in all respects be like the described element 134, except that the present element 134' has an additional arm 174 that extends from the hub part 140' to adjacent the outer end 142' of the G-portion 136' of the element so as substantially to close the gap therebetween. The arm 174 extends in the plane of the spring leaf and is sufficiently spaced at 176 from the end 142' of the G-portion 136' so as not to interfere with the normal deflection of the latter in operation. The arm 174 does not serve for any operational purpose of the spring element 134' but serves as an obstacle or deterrent to interhooking of piled spring elements of this type, as will be readily understood. The spring element 134' may have another such obstacle in the form of a short arm 178 which radiates from the hub part 140' toward a median part of the extent of the G-portion 136' between its outer end 142' and the arm portion 138'. However, the short arm 178 is sufficiently spaced at 180 from the G-portion 136' so as not to interfere with the normal deflection of the latter in operation.

While in the hereinbefore described motor 20 the spring coupling acts yieldingly to oppose lost motion between the rotor and the load on, or load connector of, the motor through only a part of the fixed lost-motion range to either end thereof, substantially all of the hereinbefore described important advantages will also be secured if a single free-motion device between the rotor and load, in distinction to a lost-motion device therebetween, is formed in part by a spring element so that there will be a fixed range of free relative motion between rotor and load within which the spring element remains unstressed, and the spring element becomes stressed and increasingly opposes to the limit of its resiliency relative motion between rotor and load beyond either end of this free-motion range. An example of such a single free-motion device is shown at 182 in Figs. 14 and 15, wherein one element of the device is formed by a spring finger 184 which is anchored with one end 186 in the hub 188 of a freely turnable pinion 190 on a shank 192 on or integral with the rotor 24', while the other end 194 of the spring finger is bent laterally into the path of the adjacent side 196 of the rotor 24'. The other element of the device 182 is the side 196 of the rotor 24' and the open segmental space 198 which this rotor side subtends. The pinion 190 may in any suitable manner be connected to a load. A directional drive control 200 is also provided which comprises an exemplary friction pawl 202 that cooperates with the hub 188 of the pinion 190, and is pivoted on a stud 204 in a cover 206 on a plate member 208 of a field casing section. A suitably anchored spring 210 serves to urge the pawl 202 against the hub 188. The directional drive control 200 acts to block clockwise rotation of the pinion 190 (Fig. 14), but permits counterclockwise rotation of the same.

Assuming now that the rotor 24' will, on energization of the field coil 212, tend to start in the correct counterclockwise direction (Fig. 14), it will be noted that the rotor has some free motion until its side 196 engages the end 194 of the spring finger 184. The rotor has by this time hardly developed sufficient torque to proceed very far against the then beginning and gradually increasing resilient resistance of the spring finger 184, especially when there is a load on the motor, wherefore the rotor will most likely reverse and proceed in reverse direction with some assistance from the spring finger which at any rate will never let the rotor come to rest outside the abovementioned free-motion range. Once in the free-motion range, the rotor will assuredly be in stable running condition when a part of its side 196 remote from the initially engaged part thereof will move into engagement with the end 194 of the spring finger 184 with sufficient energy to assume the load. However, since the directional drive control 200 blocks the pinion 190 in this reverse direction of the rotor, the latter will merely stress, in this case bend, the spring finger 184 until forced to reverse again into the correct counterclockwise direction. The stressed spring finger 184 will assist the rotor in its reversal and will also impel the same in the now correct direction until reaching the free-motion range, whereupon the rotor has again more than ample opportunity to reach stable running or phase condition long before running up against the end 194 of the spring finger 184. This time, the rotor will assuredly pick-up the load as it is gradually applied to it by the spring finger 184, as will be readily understood. If on re-energization of the field coil 212 the rotor 24' in the idle position in Fig. 14 tends to start in the wrong or clockwise direction, the starting procedure of the rotor will be the same as described above, except that the rotor will not initially run against the load and, hence, need reverse only once.

Figure 14:
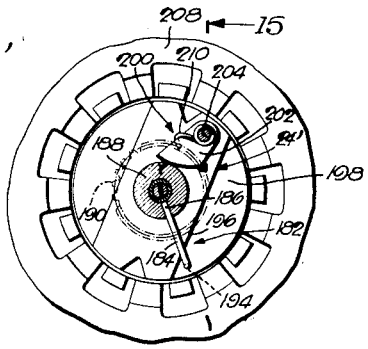
Fig. 14 is a fragmentary view, partly in section, of a motor embodying the present invention in a modified manner.
Figure 15:
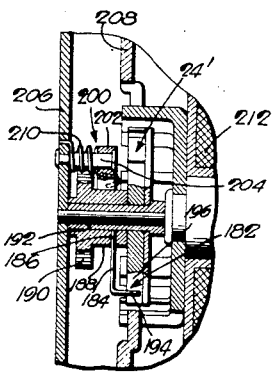
Fig. 15 is a fragmentary section through the modified motor as taken on the line 15—15 of Fig. 14.

In view of the hereinbefore described important advantages of the spring coupling in the exemplary motor 20, it is hardly necessary to point out that substantially the same advantages are secured in the somewhat different spring-coupling arrangement of Figs. 14 and 15. This same different spring-coupling arrangement may be obtained in the previously described motor 20 by simply omitting the rigid arm portion 138 of the spring element 134 and the slot 154 in the gear 90, as will be readily understood.

Figure 16:
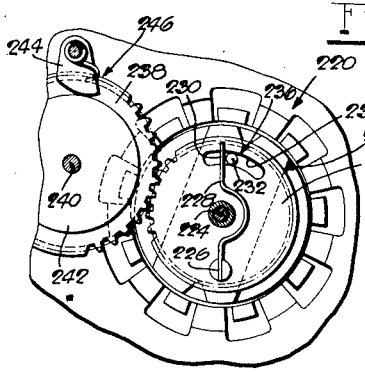
Fig. 16 is a fragmentary view, partly in section, of a motor embodying the present invention in another modified manner.

Since the aforementioned blind-spot conditions in the starting performance of previous motors of this type appear to arise primarily, if not almost exclusively, when the rotor backs only slightly, or not at all, away from the load after the current is shut off, it is also feasible, and entirely within the purview of the present invention, to provide a spring coupling only between the rotor and the load and not between the rotor and the customary directional drive control. This is demonstrated in the modified motor 220 of Fig. 16 in which a gear member 222, which is independently turnable coaxially of the rotor 24'' on a shank 224 on the latter, has anchored thereto at 226 one end of a spring finger 228 the other end 230 of which projects to one side, i. e., the load-driving side, of a pin 232 on the rotor 24'' which projects into a slot 234 in the gear member 222 to form therewith a lost-motion connection 236 between the latter and the rotor. The gear member 222 is in mesh with another gear member 238 on a torque-output shaft 240 with which a load may be connected. A disc 242 on or integral with the gear member 238 and a suitably pivoted and spring-urged friction pawl 244 together form a directional drive control 246 which prevents running of the rotor in clockwise direction, but permits its running in counterclockwise direction. It is believed that in view of the preceding detailed explanation of the performance of the spring coupling 130 in the motor 20, the performance of the instant "spring coupling" 228, 232 is self-evident and requires no detailed explanation. It is sufficient to point out that the instant spring coupling performs exactly like the previously described spring coupling 130, except that the present spring coupling does not go into action to prevent the rotor, on a wrong-directional self-start, to run up against the solid barrier of the directional drive control 246. However, as previously mentioned, it is quite rare that starting failure of a motor occurs when the rotor, on a wrong-directional self-start, runs without any resilient obstruction directly against the solid barrier of a directional drive control. The same modified mode of operation of the instant spring coupling may be achieved in the previously described motor 20 by appropriately coordinating the slots 152 and 154 in the gear 90 with the coupling fingers 144 and 150 of the spring element 134, as will be readily understood.

Figure 17:
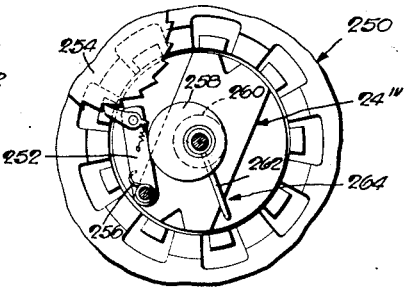
Fig. 17 is a fragmentary view, partly in section, of a motor embodying the present invention in a further modified manner.

Finally, the important advantages of the spring coupling are also fully secured insofar as they apply to a motor of this type having no directional drive control, as in the case where the rotor may run in either direction to do useful work. Thus, Fig. 17 shows a motor 250 of this type which may run in either direction to operate a suitably pivoted indexing pawl 252 for a load-carrying ratchet-disc 254. The pawl 252 is normally urged by a spring 256 against an operating cam member 258 which is independently turnable coaxially of the rotor 24''' and has a hub 260 that carries a spring finger 262 which together with the rotor forms a free-motion device 264 that is or may be like the previously-described free-motion device 182 of Fig. 14.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range

What is claimed is:

1. In a synchronous motor having a stator including field poles, the combination of a permanent-magnet rotor member starting and running in either direction on producing alternating opposite instantaneous polarities in alternate field poles; a movable member; and a driving connection between said members including means providing for free relative motion between said members through a limited range and resilient resistance to relative motion between said members beyond at least one end of said range.

2. In a synchronous motor having a stator including field poles, the combination of a permanent-magnet rotor member starting and running in either direction on producing alternating opposite instantaneous polarities in alternate field poles; a rotary member; and a driving connection between said members including means providing for free relative rotation between said members through a limited range and resilient resistance to relative rotation between said members beyond at least one end of said range.

3. In a synchronous motor having a stator including field poles, the combination of a permanent-magnet rotor member starting and running in either direction on producing alternating opposite instantaneous polarities in alternate field poles; a movable member; and a driving connection between said members including means providing for free relative motion between said members through a predetermined range and further means resiliently opposing only part of the permissible relative motion between said members to at least one end of said range.

4. In a synchronous motor having a stator including field poles, the combination of a permanent-magnet rotor member starting and running in either direction on producing alternating opposite instantaneous polarities in alternate field poles; a rotary torque-transmission member; and a driving connection between said members including means providing for lost motion between said members through a predetermined range and further means resiliently opposing only part of the permissible lost motion between said members to one end of said range.

5. In a synchronous motor having a stator including field poles, the combination of a permanent-magnet rotor member starting and running in either direction on producing alternating opposite instantaneous polarities in alternate field poles; a rotary torque-transmission member; and a driving connection between said members including means providing for lost motion between said members through a predetermined range and further means resiliently opposing only part of the permissible lost motion between said members to either end of said range.

6. In a synchronous motor having a stator including field poles, the combination of a permanent-magnet rotor member starting and running in either direction on producing alternating opposite instantaneous polarities in alternate field poles; a rotary torque-transmission member; and a driving connection between said members including means providing for lost motion between said members through a predetermined range, and spring and abutment elements turning with said members, respectively, and so coordinated with said means that said abutment element will engage and gradually stress said spring element on a part only of the permissible lost motion between said members to one end of said range in order resiliently to oppose such partial lost motion between said members.

7. In a synchronous motor having a stator including field poles, the combination of a permanent-magnet rotor member starting and running in either direction on producing alternating opposite instantaneous polarities in alternate field poles; a rotary torque-transmission member; and a driving connection between said members including a device providing for lost motion between said members through a predetermined range, and spring and abutment means turning with said members, respectively, and so coordinated with said device that said abutment means will engage and gradually stress said spring means on a part only of the permissible lost motion between said members to either end of said range in order resiliently to oppose such partial lost motion between said members.

8. The combination in a synchronous motor as set forth in claim 7, in which said spring means is a single spring element and said abutment means are spaced shoulders between which said spring element extends.

9. In a synchronous motor having a stator including field poles, the combination of a permanent-magnet rotor starting and running in either direction on producing alternating opposite instantaneous polarities in alternate field poles; and a torque-transmission drive from said rotor including coaxially independently turnable members of which a first member turns with said rotor, and a spring element anchored with one end on one of said members, the other member having angularly-spaced abutments between which the other end of said spring element extends and has free motion therebetween to permit free relative rotation between said members through a range determined by said abutments, and said spring element engaging and being stressed by either abutment on relative rotation between said members beyond either end of said range.

10. The combination in a synchronous motor as set forth in claim 9, in which said abutments are formed by the opposite end walls of a slot in said other member, and said other end of said spring element extends into and is movable in said slot.

11. The combination in a synchronous motor as set forth in claim 9, in which said spring element is a flat leaf of generally G-shape having its inner end formed as a hub part anchored to said one member axially thereof and extending with its outer end between said abutments, so that said G leaf will be subjected to torsion on relative rotation between said members beyond either end of said range.

12. The combination in a synchronous motor as set forth in claim 9, in which said abutments are formed by the opposite end walls of a concentric slot in said other member, and said spring element is a flat leaf of general G-shape having its inner end formed as a hub part anchored to said one member axially thereof and having its outer end bent inwardly into said slot, so that said G leaf will be subjected to torsion on relative rotation between said members beyond either end of said range.

13. In a synchronous motor having a stator including field poles, the combination of a permanent-magnet rotor starting and running in either direction on producing alternating opposite instantaneous polarities in alternate field poles; and a torque-transmission drive from said rotor including coaxially independently turnable members of which a first member turns with said rotor, and an element having a hub part anchored to one of said members and spring and rigid arms extending from said hub part, the other member having a first set of angularly spaced abutments between which said rigid arm extends and has free motion therebetween to permit relative rotation between said members through a range determined by said abutments, and also a second set of angularly spaced abutments between which said spring arm extends and has free motion therebetween, the abutments of each set and said abutment sets being coordinated so that either abutment of said second set engages and stresses said spring arm on relative rotation between said members through only a part of said range to the respective end thereof.

14. The combination in a synchronous motor as set forth in claim 13, in which the abutments of said first and second sets are formed by the opposite end walls of first and second slots, respectively, in said other member, and said rigid and spring arms extend into said first and second slots, respectively.

15. The combination in a synchronous motor as set forth in claim 13, in which said element is a flat spring leaf and said spring arm is formed by a leaf portion of general G-shape of which the inner end is formed as said hub part and the outer end extends between the abutments of said second set so that said G portion will be subjected to torsion when stressed, while said rigid arm is formed by another leaf portion extending radially from said hub part.

16. The combination in a synchronous motor as set forth in claim 13, in which the abutments of said first and second sets are formed by the opposite end walls of first and second concentric slots, respectively, in said other member, and said element is a flat spring leaf with said spring arm formed by a leaf portion of general G-shape of which the inner end is formed as said hub part and the outer end is bent into said second slot so that said G portion will be subjected to torsion when stressed, said hub part is anchored to said one member axially thereof, and said rigid arm is formed by another leaf portion extending radially from said hub part and having its end bent into said first slot.

17. In a synchronous motor having a stator including field poles, the combination of a permanent-magnet rotor starting and running in either direction on producing alternating opposite instantaneous polarities in alternate field poles; and a torque-transmission drive from said rotor including coaxially independently turnable members of which a first member turns with said rotor and one of said members has in its circumference a flat subtending an arc struck about the axis of said one member, and a spring element anchored with one end on the other member and extending with its other end into the path of spaced portions of said flat on said one member to permit free relative rotation between said members through a range determined by the permissible free motion of said spring element between said spaced flat portions, and said spring element engaging and being stressed by either of said flat portions on relative rotation between said members beyond either end of said range.

18. The combination in a synchronous motor as set forth in claim 17, in which said spring element is arranged to be subjected to bending on relative rotation between said members beyond either end of said range.

19. In a synchronous motor having a stator including field poles, the combination of a permanent-magnet rotor starting and running in either direction on producing alternating opposite instantaneous polarities in alternate field poles; and a torque-transmission drive from said rotor including coaxially independently turnable members of which a first member turns with said rotor, and a spring element anchored with one end on one of said members, said one member having first angularly spaced abutments and the other member having another abutment extending between said first abutments and having free motion therebetween to permit free relative rotation between said members through a range determined by said first abutments, and said spring element extending with its other end between said first abutments and to one side of said other abutment and being engaged and stressed by the latter on part only of the permissible relative rotation between said members to the corresponding end of said range.

20. A component of a torque-transmission drive from a random-directionally self-starting rotor of a synchronous motor, comprising two gears of which one gear has a center hub on which the other gear is mounted against axial removal therefrom and for rotation independently and coaxially of said other gear, and said center hub being axially bored for removably rotary mounting both gears; and a metal leaf having a hub part anchored to a first one of said gears centrally thereof, and spring and rigid arms extending from said hub part, the second one of said gears having a first set of angularly spaced abutments between which said rigid arm extends and has free motion therebetween to permit relative rotation between said gears through a range determined by said abutments, and also a second set of angularly spaced abutments between which said spring arm extends and has free motion therebetween, the abutments of each set and said abutment sets being coordinated so that either abutment of said second set engages and stresses said spring arm on relative rotation between said gears through only a part of said range to the respective end thereof.

21. A component of a torque-transmission drive as set forth in claim 20, in which the abutments of said first and second set are formed by the opposite end walls of first and second concentric slots, respectively, in said second gear, and said rigid and spring arms extend into said first and second slots, respectively.

22. A torque transmitter for use between two coaxially independently turnable members of a motor drive, comprising a plane spring leaf of general G-shape having means at its inner end for anchorage to one member and having its outer end extending laterally from the plane of said leaf for a lost-motion driving connection with a slot in the other member so that said spring leaf will be resiliently distorted and act in torsion when transmitting torque, and said laterally extending outer end being greater in length than the depth of said slot and the opposite side edges of said outer end being flared outwardly away from the plane of said leaf so as to wedge with respective end walls of said slot when in engagement therewith.

23. A torque transmitter for use between two coaxially independently turnable members of a motor drive, comprising a plane spring leaf having a first portion of general G-shape provided with means at its inner end for anchorage to one member and means at its outer end for a lost-motion type driving connection with the other member, and another straight arm portion radiating from said inner end of said first leaf portion and having at its outer end means for another lost-motion type driving connection with said other member, so that said G-shaped leaf portion will be resiliently distorted and act in torsion when transmitting torque and said arm portion will remain non-distorted when transmitting torque.

24. A torque transmitter as set forth in claim 23, in which said spring leaf is throughout said arm portion of greater width than throughout said G-portion planewise of said leaf.

25. A torque transmitter for use between two coaxially indepedently turnable members of a motor drive, comprising a plane spring leaf having a portion of general G-shape formed at its inner end as a hub part for anchorage to one member and having its outer end extending laterally from one side of the plane of said leaf for a lost-motion driving connection with a slot in the other member, and another straight arm portion radiating from said hub part and having its outer end extending laterally from said one side of the plane of said leaf for another lost-motion driving connection with a slot in said other member, so that said G-shaped leaf portion will be resiliently distorted and act in torsion when transmitting torque and said arm portion will remain non-distorted when transmitting torque.

26. A torque transmitter as set forth in claim 25, in which each of said laterally extending outer ends of said leaf portions is greater in length than the slot in said other member with which it is adapted to cooperate, and the opposite side edges of each of said laterally extending outer ends are flared outwardly away from the plane of said leaf so as to wedge with respective end walls of the cooperable slot in said other member when in engagement therewith.

27. A torque transmitter for use between two coaxially independently turnable members of a motor drive, comprising a plane spring leaf having a portion of general G-shape formed at its inner end as a hub part for anchorage to one member and having its outer end extending laterally from one side of the plane of said leaf for a lost-motion driving connection with a slot in the other member, a first straight arm portion within the confines of said G-portion remote from said outer end thereof radiating from said hub part and having its outer end extending laterally from said one side of the plane of said leaf for a lost-motion driving connection with another slot in said other member, so that said G-shaped leaf portion will be resiliently distorted and act in torsion when transmitting torque and said arm portion will remain non-distorted when transmitting torque, and another arm portion extending in the plane of said leaf from said hub part to adjacent said outer end of said G-portion substantially closing the gap therebetween and serving as an obstacle to interhooking of piled torque transmitters of this type.

28. A torque transmitter as set forth in claim 27, in which said outer end of said first arm portion is substantially diametrically opposite said outer end of said G-portion with respect to said hub part, and said spring leaf has a further arm portion extending in the plane of the latter from said hub part within the confines of said G-portion to adjacent a part of said G-portion between said outer end thereof and said first arm portion to serve as an added obstacle to interhooking of piled torque transmitters of this type.

References Cited in the file of this patent
UNITED STATES PATENTS
1,925,835    Hanson _____ Sept. 5, 1955